US009906846B2

(12) United States Patent
Luo et al.

(10) Patent No.: US 9,906,846 B2
(45) Date of Patent: Feb. 27, 2018

(54) APPARATUS AND METHOD FOR MANAGING INNER-NETWORK ELEMENT TRANSMISSION RESOURCES

(71) Applicant: ZTE Corporation, Shenzhen, Guangdong (CN)

(72) Inventors: Chun Luo, Shenzhen (CN); Xiaodong Fu, Shenzhen (CN); Zhimin Rao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 183 days.

(21) Appl. No.: 14/647,156

(22) PCT Filed: Jul. 11, 2013

(86) PCT No.: PCT/CN2013/079253
§ 371 (c)(1),
(2) Date: May 26, 2015

(87) PCT Pub. No.: WO2013/167032
PCT Pub. Date: Nov. 14, 2013

(65) Prior Publication Data
US 2015/0319513 A1    Nov. 5, 2015

(30) Foreign Application Priority Data
Nov. 23, 2012    (CN) .......................... 2012 1 0482682

(51) Int. Cl.
*H04L 12/56* (2006.01)
*H04L 12/28* (2006.01)
(Continued)

(52) U.S. Cl.
CPC ......... *H04Q 11/0003* (2013.01); *H04B 10/27* (2013.01); *H04L 41/00* (2013.01);
(Continued)

(58) Field of Classification Search
CPC ....... H04Q 11/0062; H04Q 2011/0073; H04Q 2011/0079; H04Q 2011/0086;
(Continued)

(56) References Cited

U.S. PATENT DOCUMENTS 6,876,652 B1 * 4/2005 Bell .......................... G06F 1/14
370/386
7,039,046 B1 * 5/2006 Simons ................... H04L 49/15
370/218

(Continued)

FOREIGN PATENT DOCUMENTS

| CN | 1545302 A | 11/2004 |
|---|---|---|
| CN | 102624552 A | 8/2012 |

(Continued)

OTHER PUBLICATIONS

Supplementary European Search Report in European application No. 13788294.0, dated Oct. 29, 2015.
(Continued)

*Primary Examiner* — Wutchung Chu
(74) *Attorney, Agent, or Firm* — Oppedahl Patent Law Firm LLC

(57) ABSTRACT

An apparatus for managing inner-network element transmission resources is described. The apparatus includes a resource configuration unit, a resource abstraction unit and a resource sending unit, wherein the resource configuration unit is configured to obtain information of inner-network element transmission resources and to receive a service operation instruction, and to search the resource abstraction unit for an internal path corresponding to the service operation instruction to obtain an operation command for a transmission resource; the resource abstraction unit is configured to perform abstract representation on the information of the transmission resources to obtain internal paths; the resource sending unit is configured to send the operation
(Continued)

command for the transmission resource to a corresponding board. A method for managing inner-network element transmission resources is also described. A problem of resource conflicts caused when a management plane and a control plane establish a service simultaneously can be solved by applying the apparatus and method of the disclosure, thus reducing the complexity of operating inner-network element transmission resources by a network management controller and improving the automation capability of the network management controller in service establishment.

12 Claims, 3 Drawing Sheets

(51) Int. Cl.
  *H04Q 11/00* (2006.01)
  *H04B 10/27* (2013.01)
  *H04Q 11/04* (2006.01)
  *H04L 12/24* (2006.01)
(52) U.S. Cl.
  CPC ......... *H04Q 11/0062* (2013.01); *H04Q 11/04* (2013.01); *H04Q 2011/0064* (2013.01); *H04Q 2011/0086* (2013.01)
(58) Field of Classification Search
  CPC ......... H04L 45/02; H04L 41/12; H04L 45/00; H04L 45/04; H04L 45/123; H04L 45/60; H04L 45/44; H04L 41/0806; H04L 41/0873; H04J 14/0227; H04J 3/1652; H04J 2203/0053; H04J 2203/0058; H04J 2203/0067
  USPC ........ 370/254, 351, 252, 248; 709/238, 226, 709/227, 228, 242, 224
  See application file for complete search history.

(56) References Cited

U.S. PATENT DOCUMENTS

| | | | | |
|---|---|---|---|---|
| 7,295,566 | B1* | 11/2007 | Chiu | H04L 12/5601 370/395.2 |
| 7,680,934 | B2* | 3/2010 | Aubin | H04L 12/4641 370/231 |
| 8,761,024 | B2* | 6/2014 | Zhang | H04L 41/06 370/241 |
| 2002/0176431 | A1* | 11/2002 | Golla | H04L 49/90 370/412 |
| 2003/0120822 | A1* | 6/2003 | Langrind | H04L 29/1232 709/251 |
| 2004/0031030 | A1* | 2/2004 | Kidder | G06F 1/14 717/172 |
| 2005/0122969 | A1* | 6/2005 | Nigam | H04J 3/1617 370/386 |
| 2006/0221865 | A1* | 10/2006 | Hawbaker | H04L 45/02 370/255 |
| 2006/0222361 | A1* | 10/2006 | Aoki | H04Q 11/0005 398/51 |
| 2007/0047540 | A1* | 3/2007 | Bragg | H04L 45/54 370/386 |
| 2007/0160039 | A1* | 7/2007 | Xu | H04L 41/12 370/389 |
| 2008/0049621 | A1* | 2/2008 | McGuire | H04L 12/24 370/236.2 |
| 2008/0170854 | A1* | 7/2008 | Li | H04L 45/02 398/45 |
| 2008/0175154 | A1* | 7/2008 | Ong | H04L 41/0806 370/236 |
| 2008/0279196 | A1* | 11/2008 | Friskney | H04L 12/4645 370/395.53 |
| 2009/0030664 | A1* | 1/2009 | Bridges | H04J 14/0227 703/5 |
| 2009/0196198 | A1* | 8/2009 | Zhang | H04L 41/06 370/252 |
| 2010/0202772 | A1* | 8/2010 | Wei | H04Q 11/0062 398/16 |
| 2010/0235509 | A1* | 9/2010 | Xia | G06F 17/30876 709/226 |
| 2010/0278180 | A1* | 11/2010 | Ma | H04L 12/462 370/392 |
| 2011/0286354 | A1 | 11/2011 | Zhang | |
| 2011/0296016 | A1 | 12/2011 | Zhang | |
| 2012/0141117 | A1* | 6/2012 | Kang | H04J 14/0268 398/5 |
| 2012/0141126 | A1* | 6/2012 | Feng | H04L 12/12 398/45 |
| 2012/0189305 | A1* | 7/2012 | Yang | H04L 45/128 398/45 |
| 2012/0257538 | A1* | 10/2012 | Deguchi | H04L 45/026 370/254 |

FOREIGN PATENT DOCUMENTS

| | | |
|---|---|---|
| CN | 102752148 A | 10/2012 |
| CN | 102970621 A | 3/2013 |
| EP | 1739877 A1 | 1/2007 |
| EP | 2045965 A1 | 4/2009 |
| WO | 2006136992 A2 | 12/2006 |
| WO | 2008150725 A1 | 12/2008 |

OTHER PUBLICATIONS

Architecture for the automatically switched optical network (ASON),dated Nov. 2001.
International Search Report in international application No. PCT/CN2013/079253, dated Oct. 17, 2013.
English Translation of the Written Opinion of the International Search Authority in international application No. PCT/CN2013/079253, dated Oct. 17, 2013.

* cited by examiner

APPARATUS AND METHOD FOR MANAGING INNER-NETWORK ELEMENT TRANSMISSION RESOURCES

TECHNICAL FIELD

The disclosure relates to the field of communications, and in particular to an apparatus and a method for managing inner-network element transmission resources.

BACKGROUND

An Automatically Switched Optical Network (ASON) is a dynamic automatically switched transport network and a new generation network, in which a user initiates a service request dynamically, a network element computes and selects a path automatically, and establishment, recovery and removal of a connection are integrated through signaling control. An ASON system structure is divided into three planes, including a transport plane, a control plane and a management plane.

An end-to-end service may be established automatically by a soft permanent connection and a switched connection through an ASON controller, thus greatly reducing the establishment complexity of an optical connection. However, the soft permanent connection is a service connection established by sending a command to a network element by the management plane through a network management controller. Each network element still needs to operate a service established by the network management controller on a plurality of boards and ports, thus a problem of automatic establishment is not solved.

For a transmission resource of a network element, besides a traditional management plane, the control plane is added to an ASON after the instruction of an ASON controller. That is, both a network management controller and the ASON controller are able to operate transmission resources of various boards and ports in the network element, thus leading to a problem of data consistency and resource conflicts are easily caused, and there are generally two solutions therefor.

The first method is to notify control conditions for resources to each other. In this way, resource conflicts can be avoided when two planes establish a service in different periods. However, there are still resource conflicts when services are established simultaneously. For example, when the ASON controller needs to use three resources A, B and C to establish a service 1 on a certain network element, the ASON controller has already sent to a board two resources A and B which need to be used, but has not sent the resource C to the board. Since the ASON controller has not sent to the board all resources which need to be used by the service 1, the network management controller is not notified at the moment. In the meanwhile, the network management controller, which needs to use resources E, B and D to start establishment of a service 2, will modified the resource B to be used by the network management controller without knowing that the resource B has already been used by the ASON controller. Then, although the service established by the ASON controller executes a command successfully, there is no signal actually.

The second method is resource division. That is, transmission resources in the network element are divided in advance so as to avoid mutual interference of transmission resources used by the management plane and the control plane. Although this method solves the problem of resource conflicts, a problem of resource waste is inevitable and there may be a shortage of resources on the management plane while there are idle resources on the control plane, or vice versa, which actually violates an original intention to make the ASON more flexible and more intelligent with the control plane.

SUMMARY

In view of this, a main purpose of embodiments of the disclosure is to provide an apparatus and a method for managing inner-network element transmission resources, so as to avoid a problem of resource conflicts when a management plane and a control plane establish a service simultaneously.

To realize the purpose above, technical solutions of the embodiments of the disclosure are implemented by the following way.

An embodiment of the disclosure provides an apparatus for managing inner-network element transmission resources. The apparatus includes a resource configuration unit, a resource extraction unit and a resource sending unit, wherein the resource configuration unit is configured to obtain information of inner-network element transmission resources and to send the information of the inner-network element transmission resources to the resource abstraction unit, and is further configured to receive a service operation instruction, and to search the resource abstraction unit for an internal path corresponding to the service operation instruction to obtain an operation command for a transmission resource;

the resource abstraction unit is configured to perform abstract representation on the information of the transmission resources to obtain internal paths;

the resource sending unit is configured to send the operation command for the transmission resource to a corresponding board.

In the solution above, the information of the inner-network element transmission resources may include: configuration information and dynamic change information of the resources.

In the solution above, the resource configuration unit may be further configured:

after searching, according to an input port and an output port in the service operation instruction, the resource abstraction unit for the corresponding internal path, to compare, according to resource information in the service operation instruction, whether resource information required by the service operation instruction is available on the internal path; if yes, to send, through the resource sending unit, the operation command for the transmission resource to a board involved in the internal path.

In the solution above, the resource configuration unit may be further configured:

after obtaining the operation command for the transmission resource, to determine whether the operation command for the transmission resource includes a set of board operation instructions; if no, to send the obtained operation command for the transmission resource to the resource sending unit; otherwise, to determine whether a board to which the set of board operation instructions is directed to is consistent with a board in the internal path; if yes, to send the obtained operation command for the transmission resource to the resource sending unit; otherwise, to return a service operation failure message to a sending source sending the service operation instruction.

In the solution above, after receiving a service operation instruction from a network management controller and an Automatically Switched Optical Network (ASON) controller respectively, if internal paths corresponding to the service operation instructions are identical, wherein the internal paths are found in the resource abstraction unit, the resource configuration unit may be further configured:

according to a sequence of receiving the service operation instructions, to send to a board involved in the internal paths, an operation command for a transmission resource, wherein the operation command for the transmission resource corresponds to a service operation instruction received first.

An embodiment of the disclosure further provides a method for managing inner-network element transmission resources. The method includes that:

obtaining information of inner-network element transmission resources;

performing abstract representation on the information of the inner-network element transmission resources to obtain internal paths;

receiving a service operation instruction, searching for an internal path corresponding to the service operation instruction to obtain an operation command for a transmission resource, and sending the operation command for the transmission resource to a corresponding board.

In the solution above, the information of the inner-network element transmission resources may include: configuration information and dynamic change information of the resources.

In the solution above, the method may further include: after searching for the internal path corresponding to the service operation instruction, according to resource information in the service operation instruction, comparing whether resource information required by the service operation instruction is available on the internal path; if yes, performing an operation of sending the operation command for the transmission resource to a board involved in the internal path.

In the solution above, the method may further include: before sending the operation command for the transmission resource to the corresponding board, determining whether the operation command for the transmission resource includes a set of board operation instructions; if no, sending the obtained operation command for the transmission resource to a board involved in the internal path; otherwise, determining whether a board to which the set of board operation instructions is directed to is consistent with the board in the internal path; if yes, sending the obtained operation command for the transmission resource to the board involved in the internal path; otherwise, returning a service operation failure message to a sending source sending the service operation instruction.

In the solution above, the method may further include: service operation instructions are from a network management controller and an Automatically Switched Optical Network (ASON) controller respectively, if found internal paths corresponding to the service operation instructions are identical, according to a sequence of receiving the service operation instructions, sending an operation command for a transmission resource to a board involved in the internal paths, wherein the operation command for the transmission resource corresponds to a service operation instruction received first.

In the solution above,

In the embodiments of the disclosure, all operations for inner-network element transmission resources are sent by a transmission resource management apparatus. In this way, the inner-network element transmission resources are managed by the transmission resource management apparatus in a unified manner instead of being controlled by a network management controller and an ASON controller separately.

Further, when the network management controller and the ASON controller operate the same resource simultaneously, the transmission resource management apparatus will process the resource according to a sequence of receiving service operation instructions, thus avoiding a problem of resource conflicts when a management plane and a control plane establish a service simultaneously while improving the success rate of service establishment of the management plane and the control plane.

In addition, a service established by the network management controller only needs to select an input port and an output port and information of various layers in the embodiments of the disclosure, thus simplifying the complexity of operating inner-network element transmission resources by the network management controller, reducing interaction commands of the network management controller and transmission resources, reducing the complexity of manual configuration, and improving the automation capability of the network management controller in service establishment while improving automaticity of the apparatus and the maintenance capability of a network manager to fully reflect intelligence of service establishment of the network management controller.

DETAILED DESCRIPTION

The basic idea of the embodiments of the disclosure is that: a transmission resource management apparatus is set in each network element; the transmission resource management apparatus includes a resource configuration unit, a resource abstraction unit and a resource sending unit, wherein the resource abstraction unit performs abstract representation for information of inner-network element transmission resources obtained by the resource configuration unit to obtain internal paths; the resource configuration unit receives a service operation instruction sent by a network management controller or an ASON controller, searches the resource abstraction unit for an internal path corresponding to the service operation instruction to obtain an operation command for a transmission resource; the resource sending unit sends the operation command for the transmission resource to a corresponding board; when the network management controller operates an inner-network element transmission resource, the resource abstraction unit notifies the ASON controller of the resource operated by the network management controller; when the ASON controller operates an inner-network element transmission resource, the resource configuration unit notifies the network management controller of the resource operated by the ASON controller; therefore, resources in a network element can be managed in a unified manner.

Figure 1:
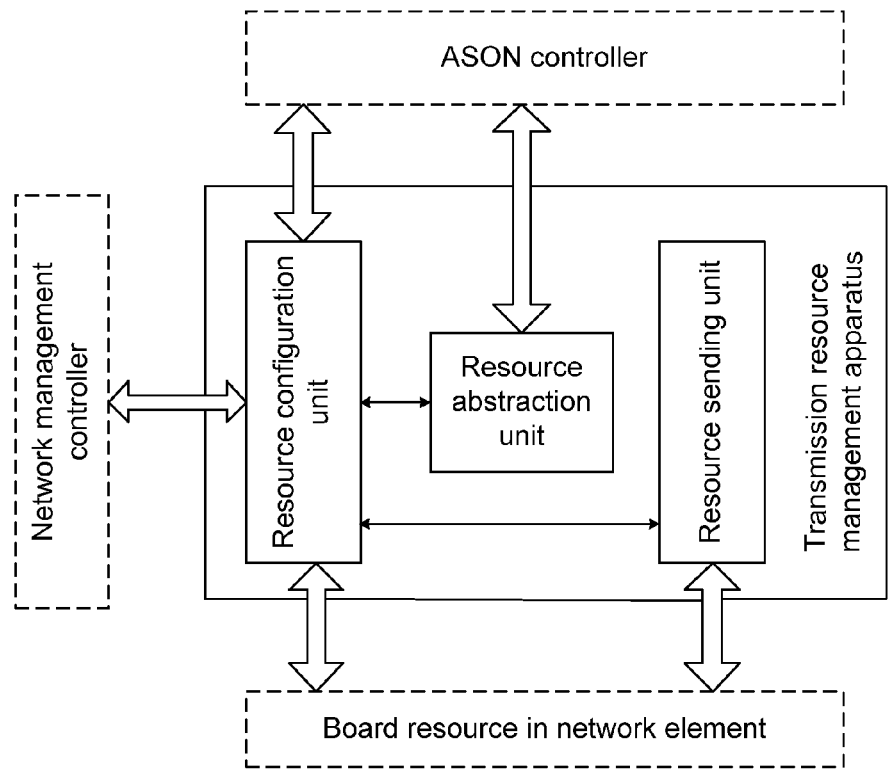
FIG. 1 is a schematic diagram of an internal structure of a transmission resource management apparatus according to an embodiment of the disclosure.

FIG. 1 is a schematic diagram of an internal structure of a transmission resource management apparatus according to an embodiment of the disclosure. As shown in FIG. 1, the transmission resource management apparatus is run on each network element and may be located on a transport plane. The transmission resource management apparatus includes a resource configuration unit, a resource abstraction unit and a resource sending unit, wherein:

the resource configuration unit is configured to obtain information of inner-network element transmission resources and to send the information of the inner-network element transmission resources to the resource abstraction unit, and is further configured to receive a service operation instruction sent by a network management controller or an ASON controller, and to search the resource abstraction unit for an internal path corresponding to the service operation instruction to obtain an operation command for a transmission resource;

the resource abstraction unit is configured to perform abstract representation on the information of the transmission resources to obtain internal paths;

the resource sending unit is configured to send the operation command for the transmission resource to a corresponding board.

Specifically, the resource configuration unit is a unique interface for processing service operation instructions of the network management controller and the ASON controller for transmission resources.

Specifically, the information of the inner-network element transmission resources includes: configuration information and dynamic change information of the resources. The configuration information may be a combination of a board address and a port number between an input port and an output port of each board in a network element.

Specifically, the resource configuration unit may obtain the information of the transmission resources according to any method, e.g. the resource configuration unit may obtain the information of the transmission resources by initiating a query to the network management controller, may also obtain the information of the transmission resources by initiating a query to a managed board, and may further obtain the information of the transmission resources by initiative reporting of a board.

Here, configuration information of a network element of an Optical Transport Network (OTN) includes, but is not limited to a board address, a port number, an optical fiber connection, a range of wavelengths or time slots supported on a port, and a related property of a service.

Specifically, the abstract representation performed by the resource abstraction unit for the information of the inner-network element transmission resources is that the information of the inner-network element transmission resources is represented as internal paths of a series of combinations of board addresses and port numbers between input ports and output ports. The resource abstraction unit mainly abstracts connection relations among all external ports and their service bearing capabilities.

The resource abstraction unit is further configured to notify an internal path to the ASON controller so that the ASON controller performs flooding on the internal path.

After receiving the internal path sent by the resource abstraction unit, the ASON controller performs flooding on the internal path and obtains an abstract model of transmission resources of the whole network so that a path calculation unit may perform path calculation. An internal path change involved after an operation command of a transmission resource related to a service is sent to a board also needs to be notified to the ASON controller in time so that the ASON controller may perform dynamic flooding.

Specifically, the resource configuration unit is specifically configured to receive the service operation instruction sent by the network management controller or the ASON controller, to search the resource abstraction unit for the corresponding internal path according to an input port and an output port in the service operation instruction to obtain the operation command for the transmission resource, and to send, through the resource sending unit, the operation command for the transmission resource to the corresponding board, and further to receive, through the resource sending board, a response message of the board.

After searching the resource abstraction unit for the corresponding internal path according to the input port and the output port in the service operation instruction, the resource configuration unit is further configured to compare, according to resource information in the service operation instruction, whether resource information required by the service operation instruction is available on the internal path; if yes, to send through the resource sending unit the operation command for the transmission resource to the board involved in the internal path; otherwise, to perform no operation.

After obtaining the operation command for the transmission resource, the resource configuration unit is further configured:

to determine whether the service operation instruction includes a set of board operation instructions; if no, to send the obtained operation command for the transmission resource to the resource sending unit; otherwise, to determine whether a board to which the set of board operation instructions is directed to is consistent with the board in the internal path; if yes, to send the obtained operation command for the transmission resource to the resource sending unit; otherwise, to return a service operation failure message to a sending source (the network management controller or the ASON controller) sending the service operation instruction.

After receiving a service operation instruction from the network management controller and the ASON controller respectively, if internal paths corresponding to the service operation instructions are identical, wherein the internal paths are found in the resource abstraction unit, the resource configuration unit is further configured: according to a sequence of receiving the service operation instructions, to send to a board involved in the internal paths, an operation command for a transmission resource, wherein the operation command for the transmission resource corresponds to a service operation instruction received first.

Figure 2:
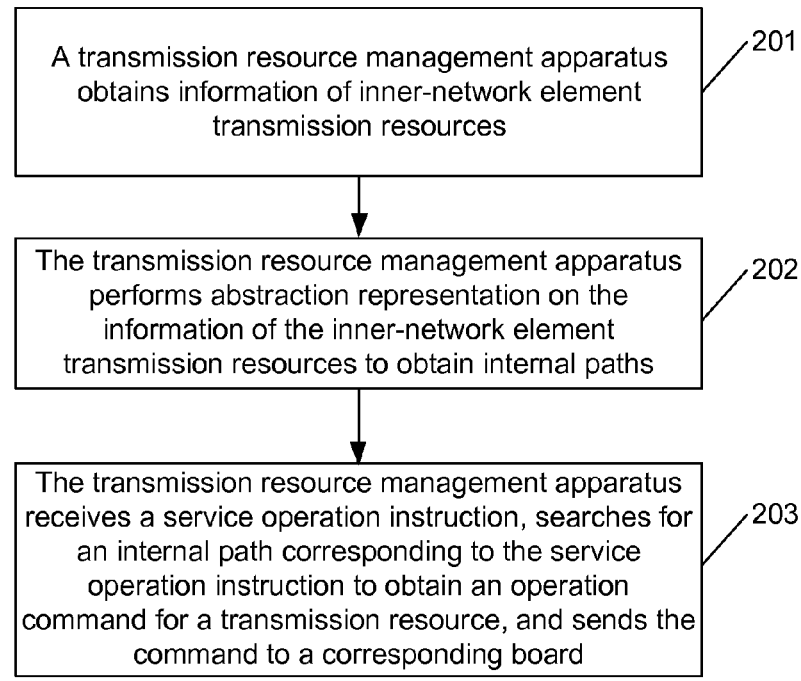
FIG. 2 is a schematic diagram of an implementation process of a method for managing inner-network element transmission resources according to an embodiment of the disclosure.

FIG. 2 is a schematic diagram of an implementation process of a method for managing inner-network element transmission resources according to an embodiment of the disclosure. As shown in FIG. 2, the method includes the following steps.

Step 201: A transmission resource management apparatus obtains information of inner-network element transmission resources.

Specifically, after the transmission resource management apparatus is run, a resource configuration unit in the transmission resource management apparatus obtains the information of the inner-network element transmission resources.

The information includes configuration information and dynamic change information of the resources.

The resource configuration unit may obtain the information of the transmission resources according to any method, e.g. the resource configuration unit may obtain the information of the transmission resources by initiating a query to a network management controller, may also obtain the information of the transmission resources by initiating a query to a managed board, and may further obtain the information of the transmission resources by initiative reporting of a board.

Step 202: The transmission resource management apparatus performs abstraction representation on the information of the inner-network element transmission resources to obtain internal paths.

Specifically, a resource abstraction unit of the transmission resource management apparatus performs the abstraction representation on the information of the inner-network element transmission resources to represent the information of the inner-network element transmission resources as internal paths of a series of combinations of board addresses and port numbers between input ports and output ports.

Here, an abstraction method refers to that the information of the inner-network element transmission resources should be represented as a series of combinations of board addresses and port numbers between input ports and output ports after being abstracted, abbreviated as internal paths as below: Board Address 1 (Port 1), Board Address 2 (Port 2), . . . , Board Address n (Port n). If an input port is Board Address 1 (Port 1) and an output port is Board Address n (Port n), the resource abstraction unit will abstract various paths implementing the input port and the output port. That is, it is only necessary to ensure that the input port and the output port are Board Address 1 (Port 1) and Address n (Port n), respectively.

Step 203: The transmission resource management apparatus receives a service operation instruction sent by a network management controller or an ASON controller, searches for an internal path corresponding to the service operation instruction to obtain an operation command for a transmission resource, and sends the operation command for the transmission resource to a corresponding board.

Specifically, a resource configuration unit in the transmission resource management apparatus receives the service operation instruction sent by the network management controller or the ASON controller, searches the resource abstraction unit for the corresponding internal path according to an input port and an output port in the service operation instruction to obtain the operation command for the transmission resource.

The step of sending the operation command for the transmission resource to the corresponding board specifically includes that:

the resource configuration unit in the transmission resource management apparatus sends, through a resource sending unit in the transmission resource management apparatus, the operation command for the transmission resource to the board involved in the internal path.

After searching for the internal path corresponding to the service operation instruction, the method further includes that:

the transmission resource management apparatus, which may be specifically the resource configuration unit in the transmission resource management apparatus, compares according to resource information in the service operation instruction, whether resource information required by the service operation instruction is available on the internal path; if yes, performs through the resource sending unit, the operation of sending the operation command for the transmission resource to the board involved in the internal path; otherwise, performs no operation.

Specifically, before sending the operation command for the transmission resource to the corresponding board, the method further includes that:

the transmission resource management apparatus, which may be specifically the resource configuration unit in the transmission resource management apparatus, determines whether the operation command for the transmission resource includes a set of board operation instructions; if no, sends through the resource sending unit the operation command for the transmission resource to the board involved in the internal path; otherwise, determines whether a board to which the set of board operation instructions is directed to is consistent with the board in the internal path; if yes, sends, through the resource sending unit, the operation command for the transmission resource to the board involved in the internal path; otherwise, returns a response message, i.e. a service operation failure message to a sending source.

Specifically, after the transmission resource management apparatus, which may be specifically the resource configuration unit in the transmission resource management apparatus, receives service operation instructions from the network management controller and the ASON controller respectively, if it is found that internal paths corresponding to the service operation instructions are identical, it sends, according to a sequence of receiving the service operation instructions, an operation command for a transmission resource to a board involved in the internal paths, wherein the operation command for the transmission resource corresponds to a service operation instruction received first.

Figure 3:
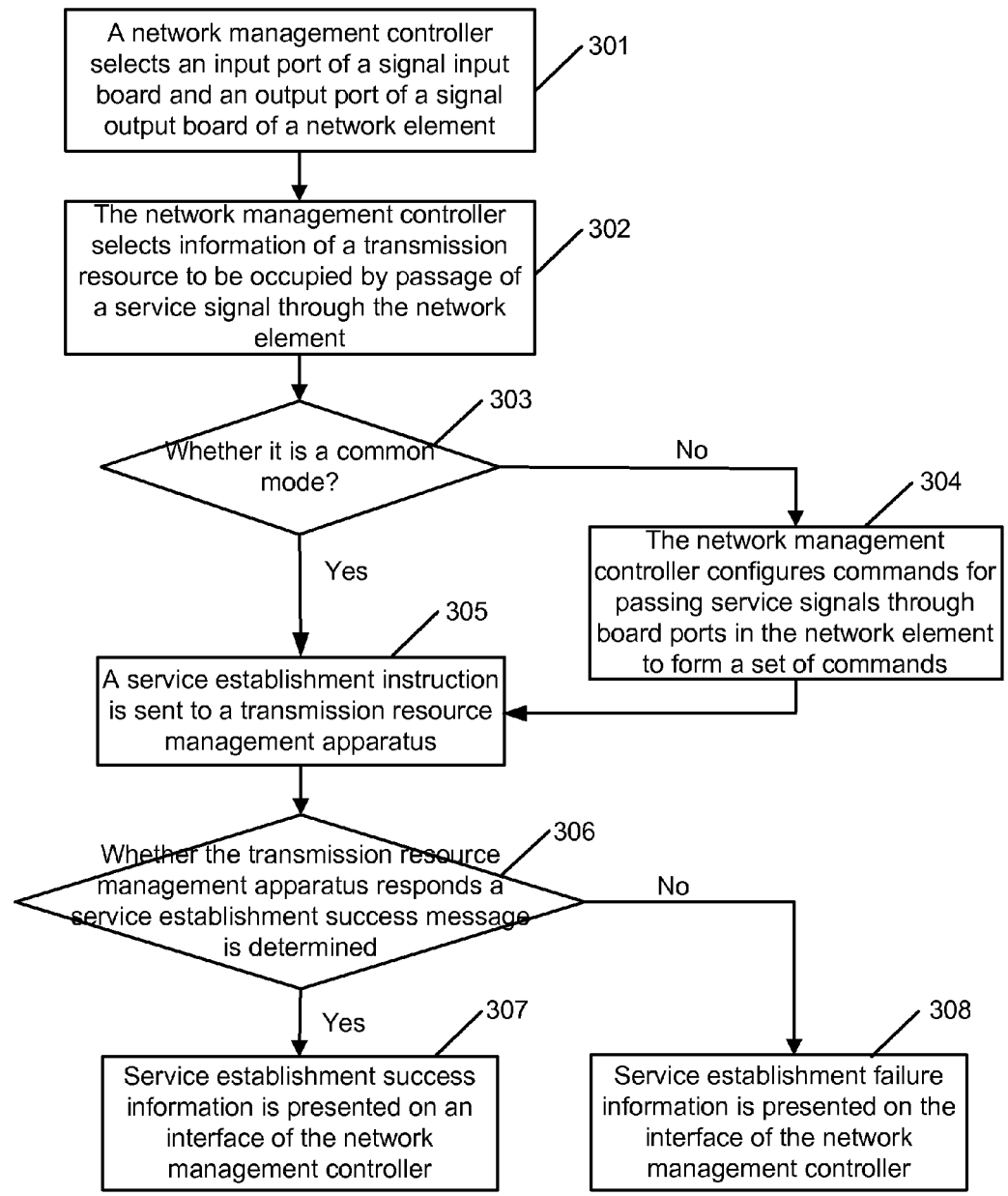
FIG. 3 is a schematic diagram of an implementation process of initiating service establishment by a network management controller according to an embodiment of the disclosure.

FIG. 3 is a schematic diagram of an implementation process of initiating service establishment by a network management controller according to an embodiment of the disclosure. As shown in FIG. 3, the process includes the following steps.

Step 301: The network management controller selects an input port of a signal input board and an output port of a signal output board of a network element.

Step 302: The network management controller selects information of a transmission resource to be occupied by passage of a service signal through the network element.

Specifically, if the information is information of an optical layer, the information may be specifically frequency and power of a used wavelength etc. If the information is information of an electric layer, the information may be specifically, a time slot, a level and a bandwidth of an Optical Data Unit (ODUk) etc.

Step 303: The network management controller determines whether a service to be established is in a common mode. If yes, step 305 is performed. Otherwise, the service to be established is in a special mode, and step 304 is performed.

Here, the network management controller is allowed to operate all boards of the network element under the special mode. However, the operation needs to be sent as a set of commands. The set of commands represents a set of operation commands for boards between input ports and output ports.

Step 304: The network management controller configures commands for passing service signals through board ports in the network element to form a set of commands, which is specifically implemented according to the prior art and will not be described repeatedly here. Then, step 305 is performed.

Step 305: The network management controller sends a service establishment instruction to a transmission resource management apparatus.

Specifically, the network management controller packages all board operation commands into a combined subsidiary service establishment command to be sent to a resource configuration unit in the transmission resource management apparatus.

Step 306: The network management controller receives a response message returned by the transmission resource management apparatus which may be specifically the resource configuration unit in the transmission resource management apparatus. If the response message is a service establishment success message, step 307 is performed. Otherwise, step 308 is performed.

Step 307: Service establishment success information is presented on an interface of the network management controller.

Specifically, when the service establishment success information is presented on the interface of the network management controller, the network management controller may perform an operation for a service of the next network element.

Step 308: Service establishment failure information is presented on the interface of the network management controller.

Specifically, when the service establishment failure information is presented on the interface of the network management controller, the network management controller may perform the next service establishment after re-planning a service according to a reason reported by the transmission resource management apparatus.

Specifically, a failure reason reported by the resource configuration unit in the transmission resource management apparatus may include a resource conflict, an available resource prompt and an unperformed board operation etc. The network management controller may perform the next service establishment after re-planning the service according to the reported reason.

A process of initializing service establishment by an ASON controller includes that: an ASON controller in a network element determines, according to a display router receiving a signaling, an input port and an output port of the network element, determines resource information according to a label included in the signaling, and sends to a transmission resource management apparatus, which may be specifically a resource configuration unit in the transmission resource management apparatus, the input port and the output port as well as the resource information as a service establishment instruction, determines according to a response of the transmission resource management apparatus, which may be specifically the resource configuration unit in the transmission resource management apparatus, whether the service establishment instruction is successful, if the label is not included in the signaling, requests the transmission resource management apparatus, which may be specifically the resource configuration unit in the transmission resource management apparatus, to allocate a label, and fills the label in the signaling to be forwarded after the service establishment instruction is successful.

Figure 4:
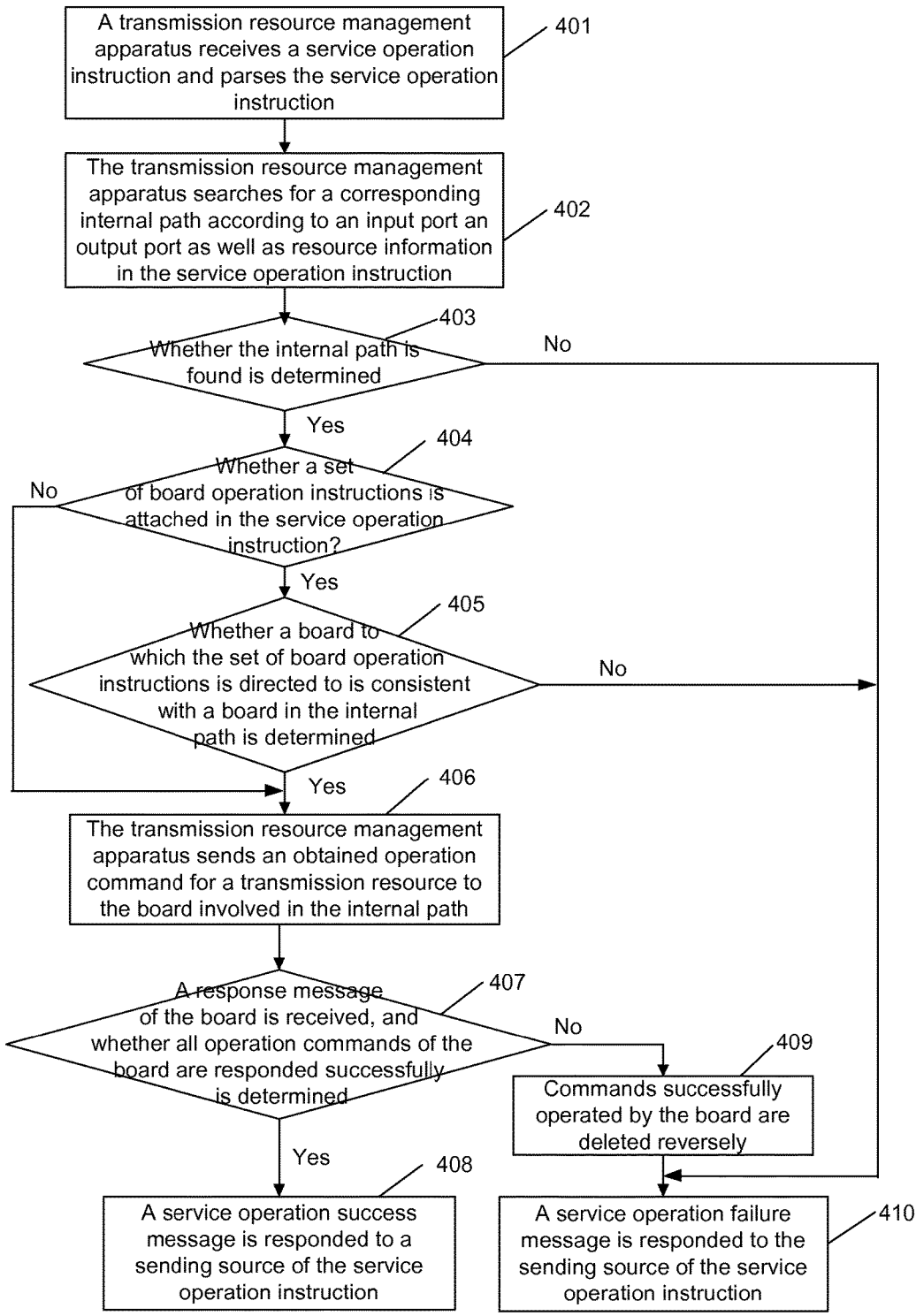
FIG. 4 is a schematic diagram of a process of processing a received service operation instruction by a transmission resource management apparatus according to an embodiment of the disclosure.

FIG. 4 is a schematic diagram of a process of processing a received service operation instruction by a transmission resource management apparatus according to an embodiment of the disclosure. As shown in FIG. 4, the transmission resource management apparatus processes service operation instructions sent by a network management controller and an ASON controller according to the same process, including the following steps.

Step 401: The transmission resource management apparatus receives a service operation instruction and parses the service operation instruction.

Specifically, a resource configuration unit in the transmission resource management apparatus receives a service operation instruction sent by the network management controller or the ASON controller, performs parsing to obtain an input port and an output port in the service operation instruction as well as resource information required by the service operation instruction.

Step 402: The transmission resource management apparatus searches for a corresponding internal path according to the input port and the output port in the service operation instruction.

Step 403: The transmission resource management apparatus determines whether the internal path is found. If yes, step 404 is performed. Otherwise, step 410 is performed.

Specifically, the resource configuration unit in the transmission resource management apparatus searches a resource abstraction unit for the corresponding internal path according to the input port and the output port in the service operation instruction, after finding the corresponding internal path, compares whether the resource information required by the service operation instruction is available on the corresponding internal path. If yes, it is considered that the corresponding internal path is found. Otherwise, it is considered that the corresponding internal path is not found.

Since a service capability that may be supported by the input port and the output port is preconfigured, the resource configuration unit is able to compare, according to resource information in the service operation instruction, whether the resource information required by the service operation instruction is available on the internal path. The service capability that may be supported by the input port and the output port may be information including the total number of wavelengths that can be supported, the number of wavelengths that have already been used currently, and the number of remaining available wavelengths etc. for an optical layer, and may be information including the number of time slots that can be supported, the number of time slots that have already been used currently, and the number of remaining available time slots etc. for an electric layer.

Here, a service operation instruction sent by the ASON controller may not include resource information. The resource configuration unit in the transmission resource management apparatus may select an available resource, and returns the available resource to the ASON controller after a command is executed successfully. The ASON controller uses the available resource as a newly allocated label to forward a signaling.

Step 404: The transmission resource management apparatus determines whether a set of board operation instructions is attached in the service operation instruction. If yes, step 405 is performed. Otherwise, step 406 is performed.

Specifically, a resource sending unit in the transmission resource management apparatus determines, according to an identifier in the service operation instruction, whether the service operation instruction includes the set of board operation instructions.

Step 405: The transmission resource management apparatus determines whether a board to which the set of board operation instructions is directed to is consistent with a board in the internal path. If not, step 410 is performed, and a service operation failure message is responded to a sending source of the service operation instruction. If yes, step 406 is performed.

Specifically, the resource configuration unit in the transmission resource management apparatus determines whether the board to which the set of board operation instructions is directed to is consistent with the board in the internal path. If yes, the resource sending unit sends an obtained operation command for a transmission resource to the board involved in the internal path. Otherwise, a service operation failure message is returned to the sending source.

Step 406: The transmission resource management apparatus sends the obtained operation command for the transmission resource to the board involved in the internal path.

Specifically, the resource configuration unit in the transmission resource management apparatus performs the operation of sending, through the resource sending unit, the obtained operation command for a transmission resource to the board involved in the internal path.

Step 407: The transmission resource management apparatus receives a response message of the board, and determines whether all board operation commands are responded successfully. Operation for resources is considered to be successful only when the all board operation commands are responded successfully and step 408 is performed. Otherwise, it is considered that the operation for the resources fails, and step 409 is performed.

Specifically, the resource sending unit in the transmission resource management apparatus receives the response message of the board.

Here, since only the transmission resource management apparatus can operate a resource for the board in the embodiment of the disclosure, a failure in a service operation is impossible unless the board fails. Therefore, another implementation method may be directly considering that all resource operations are successful. For a failure of the board, after checking and eliminating the failure, the resource sending unit in the transmission resource management apparatus may send an operation command for a transmission resource to a corresponding board again.

Step 408: The transmission resource management apparatus responds a service operation success message to the sending source of the service operation instruction.

Specifically, the resource sending unit in the transmission resource management apparatus receives the response message of the board. If all resource operations for the board involved in the internal path are successful, the resource configuration unit responds the service operation success message to the sending source.

Here, when the resource configuration unit of the transmission resource management apparatus responds the service operation success message to the sending source of the service operation instruction, an interface of the network management controller may display a service established on a network element, and the resource configuration unit dynamically updates the internal path through the resource abstraction unit. The resource abstraction unit notifies the ASON controller that resource information between an input port and an output port has been changed so that the ASON controller performs dynamic resource flooding to exclude a resource used by establishing the service during subsequent path calculation.

Step 409: The transmission resource management apparatus reversely deletes a board operation success command so that a state of the resource in the network element is back to a condition before the service establishment.

Specifically, the resource sending unit in the transmission resource management apparatus receives the response message of the board. If not all resource operations for the board are successful, the resource sending unit reversely deletes successful operations for the board.

Step 410: The transmission resource management apparatus responds the service operation failure message to the sending resource of the service operation instruction.

Specifically, after receiving an operation failure of the board involved in the internal path, the resource sending unit in the transmission resource management apparatus returns the service operation failure message to the sending source.

Besides, a service deletion process of the network management controller or the ASON controller includes that: the network management controller or the ASON controller sends a service deletion instruction to the transmission resource management apparatus which may be specifically the resource configuration unit in the transmission resource management apparatus. The service deletion instruction needs to include an input port and an output port of a service on a network element, resource information and other service information. The transmission resource management apparatus, which may be specifically the resource configuration unit in the transmission resource management apparatus, locates according to the input port and the output port, an internal path in which the service has been established. Specifically, the resource sending unit in the transmission resource management apparatus sends a resource recovery command to a board that needs to be operated on the internal path. After the board responds a success to the transmission resource management apparatus which may be specifically the resource sending unit in the transmission resource management apparatus, the transmission resource management apparatus, which may be specifically the resource abstraction unit in the transmission resource management apparatus, updates abstraction resources and notifies the ASON controller, reports to the network management controller, and responds a service deletion success message to a sending source of the service deletion instruction.

The foregoing descriptions are only preferred embodiments of the disclosure and are not used for limiting the protection scope of the disclosure. Any modifications, equivalent replacements and improvements and the like made within the spirit and scope of the disclosure shall be included within the protection scope of the disclosure.

INDUSTRIAL APPLICABILITY

In the embodiments of the disclosure, all operations for inner-network element transmission resources are sent by a transmission resource management apparatus. In this way, the inner-network element transmission resources are managed by the transmission resource management apparatus in a unified manner instead of being controlled by a network management controller and an ASON controller separately. When the network management controller and the ASON controller operate the same resource simultaneously, the transmission resource management apparatus will process the resource according to a sequence of receiving service operation instructions, thus avoiding a problem of resource conflicts when a management plane and a control plane establish a service simultaneously while improving the success rate of service establishment of the management plane and the control plane.

What is claimed is:

1. An apparatus for managing inner-network element transmission resources, the apparatus is run on each network element and comprise:
one or more processors;
a plurality of program modules, when, executed by the one or more processors, cause the apparatus to perform predefined functions, the plurality of program modules further comprising: a resource configuration module, a resource abstraction module and a resource sending module, wherein:
the resource configuration module is configured to obtain information of inner-network element transmission resources and to send the information of the inner-network element transmission resources to the resource abstraction module, and is further configured to receive a service operation instruction, and to search the resource abstraction module for an internal path corresponding to the service operation instruction to obtain an operation command for a transmission resource;
the resource abstraction module is configured to perform abstract representation on the information of the transmission resources to obtain internal paths;
the resource sending module is configured to send the operation command for the transmission resource to a corresponding board;
wherein the resource configuration module is further configured: after obtaining the operation command for the transmission resource, to determine whether the operation command for the transmission resource includes a set of board operation instructions; if no, to send the obtained operation command for the transmission resource to the resource sending module; otherwise, to determine whether a board to which the set of board operation instructions is directed to is consistent with a board in the internal path; if yes, to send the obtained operation command for the transmission resource to the resource sending module; otherwise, to return a service operation failure message to a sending source sending the service operation instruction.

2. The apparatus according to claim 1, wherein the information of the inner-network element transmission resources comprises: configuration information and dynamic change information of the resources.

3. The apparatus according to claim 1, wherein the resource configuration module is further configured:
after searching, according to an input port and an output port in the service operation instruction, the resource abstraction module for the corresponding internal path, to compare, according to resource information in the service operation instruction, whether resource information required by the service operation instruction is available on the internal path; if yes, to send, through the resource sending module, the operation command for the transmission resource to a board involved in the internal path.

4. The apparatus according to claim 1, wherein after receiving a service operation instruction from a network management controller and an Automatically Switched Optical Network (ASON) controller respectively, if internal paths corresponding to the service operation instructions are identical, wherein the internal paths are found in the resource abstraction module, the resource configuration module is further configured:
according to a sequence of receiving the service operation instructions, to send to a board involved in the internal paths, an operation command for a transmission resource, wherein the operation command for the transmission resource corresponds to a service operation instruction received first.

5. The apparatus according to claim 2, wherein after receiving a service operation instruction from a network management controller and an Automatically Switched Optical Network (ASON) controller respectively, if internal paths corresponding to the service operation instructions are identical, wherein the internal paths are found in the resource abstraction module, the resource configuration module is further configured:
according to a sequence of receiving the service operation instructions, to send to a board involved in the internal paths, an operation command for a transmission resource, wherein the operation command for the transmission resource corresponds to a service operation instruction received first.

6. The apparatus according to claim 3, wherein after receiving a service operation instruction from a network management controller and an Automatically Switched Optical Network (ASON) controller respectively, if internal paths corresponding to the service operation instructions are identical, wherein the internal paths are found in the resource abstraction module, the resource configuration module is further configured:
according to a sequence of receiving the service operation instructions, to send to a board involved in the internal paths, an operation command for a transmission resource, wherein the operation command for the transmission resource corresponds to a service operation instruction received first.

7. A method for managing inner-network element transmission resources, comprising:
obtaining information of inner-network element transmission resources;
performing abstract representation on the information of the inner-network element transmission resources to obtain internal paths;
receiving a service operation instruction, searching for an internal path corresponding to the service operation instruction to obtain an operation command for a transmission resource, and sending the operation command for the transmission resource to a corresponding board;
the method further comprising: before sending the operation command for the transmission resource to the corresponding board,
determining whether the operation command for the transmission resource includes a set of board operation instructions; if no, sending the obtained operation command for the transmission resource to a board involved in the internal path; otherwise, determining whether a board to which the set of board operation instructions is directed to is consistent with the board in the internal path; if yes, sending the obtained operation command for the transmission resource to the board involved in the internal path; otherwise, returning a service operation failure message to a sending source sending the service operation instruction.

8. The method according to claim 7, wherein the information of the inner-network element transmission resources comprises: configuration information and dynamic change information of the resources.

9. The method according to claim 7, further comprising: after searching for the internal path corresponding to the service operation instruction, according to resource information in the service operation instruction, comparing whether resource information required by the service operation instruction is available on the internal path; if yes, performing an operation of sending the operation command for the transmission resource to a board involved in the internal path.

10. The method according to claim 7, further comprising: service operation instructions are from a network management controller and an Automatically Switched Optical Network (ASON) controller respectively, if found internal paths corresponding to the service operation instructions are identical, according to a sequence of receiving the service operation instructions, sending an operation command for a transmission resource to a board involved in the internal paths, wherein the operation command for the transmission resource corresponds to a service operation instruction received first.

11. The method according to claim 8, further comprising: service operation instructions are from a network management controller and an Automatically Switched Optical Network (ASON) controller respectively, if found internal paths corresponding to the service operation instructions are identical, according to a sequence of receiving the service operation instructions, sending an operation command for a transmission resource to a board involved in the internal paths, wherein the operation command for the transmission resource corresponds to a service operation instruction received first.

12. The method according to claim 9, further comprising: service operation instructions are from a network management controller and an Automatically Switched Optical Network (ASON) controller respectively, if found internal paths corresponding to the service operation instructions are identical, according to a sequence of receiving the service operation instructions, sending an operation command for a transmission resource to a board involved in the internal paths, wherein the operation command for the transmission resource corresponds to a service operation instruction received first.

* * * * *